Sept. 12, 1933.  G. W. BUTTS ET AL  1,926,432
TRANSPORTATION CONTAINER
Filed June 27, 1932  4 Sheets-Sheet 1
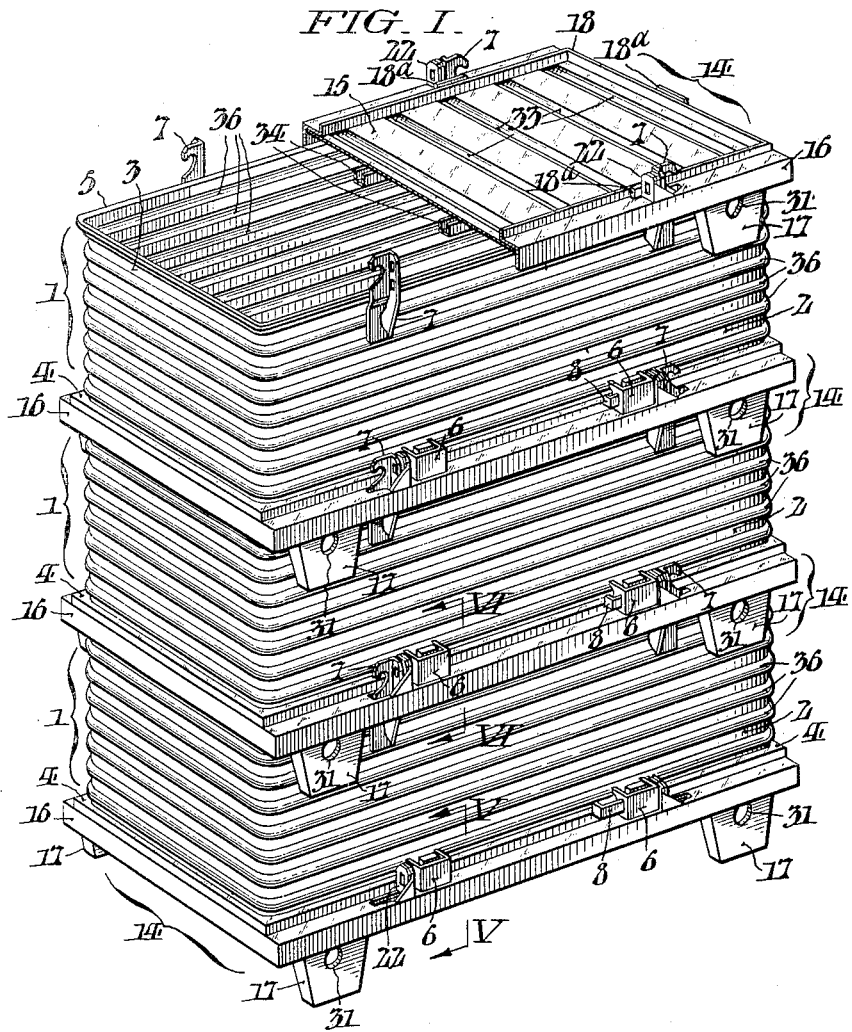
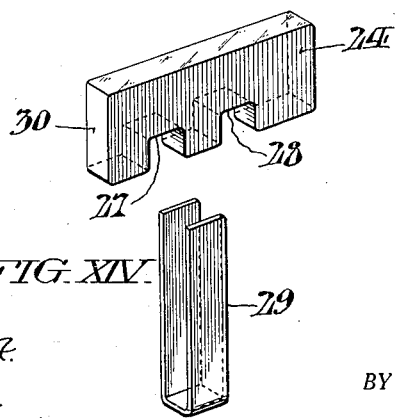
WITNESSES:  INVENTOR:
George W. Butts &
Albert C. Stewart,
BY
ATTORNEYS.

Sept. 12, 1933.  G. W. BUTTS ET AL  1,926,432
TRANSPORTATION CONTAINER
Filed June 27, 1932  4 Sheets-Sheet 2
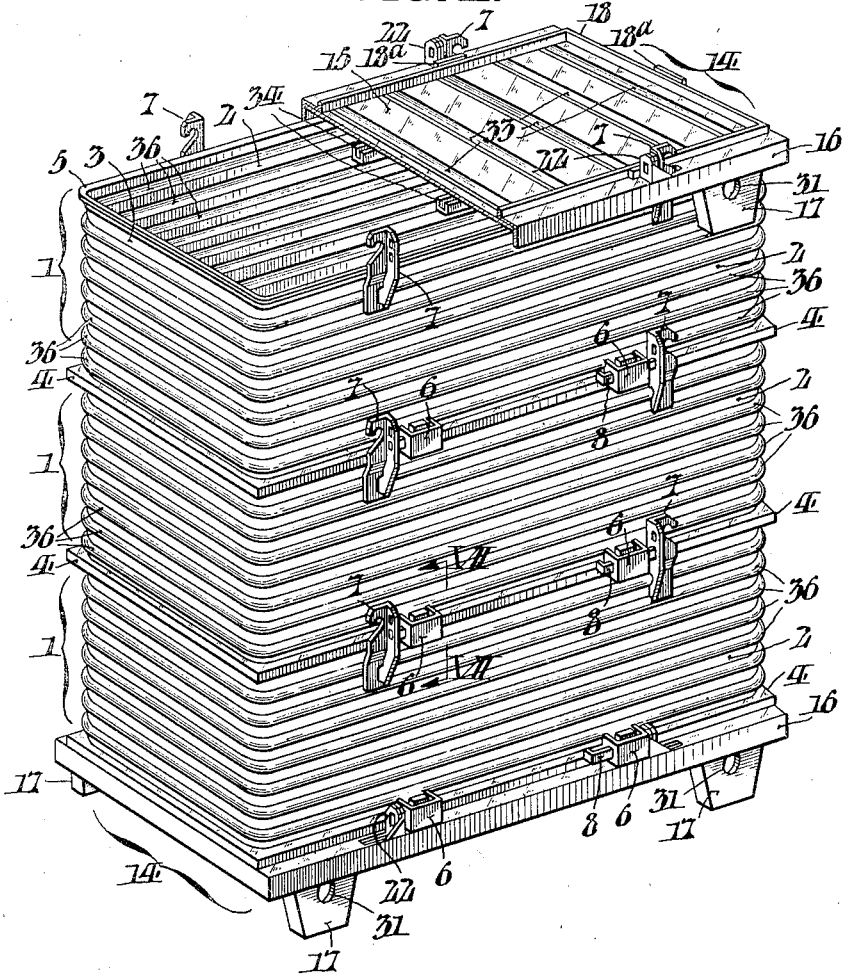
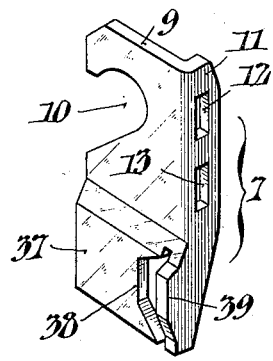
WITNESSES:
Thomas W. Kerr, Jr.
William Bell, Jr.
INVENTOR:
George W. Butts &
Albert C. Stewart,
BY Frailey Paul
ATTORNEYS.

Sept. 12, 1933.  G. W. BUTTS ET AL  1,926,432
TRANSPORTATION CONTAINER
Filed June 27 1932   4 Sheets-Sheet 3
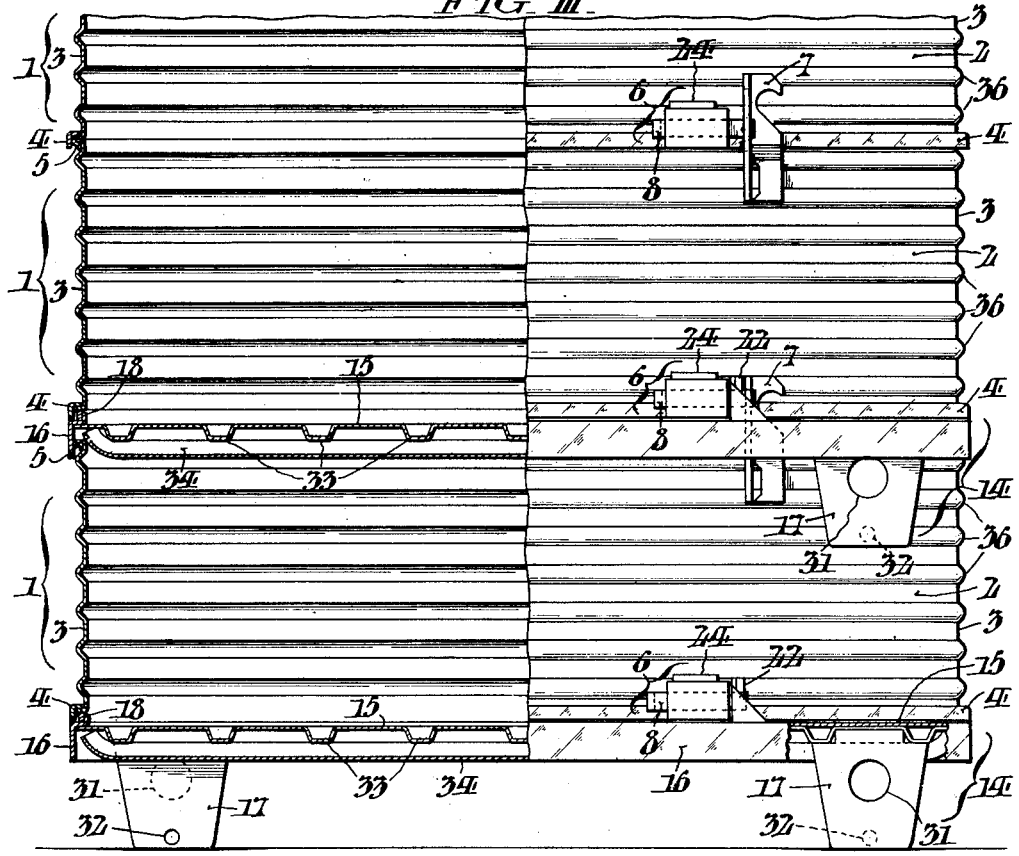
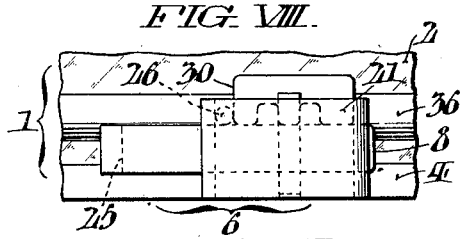
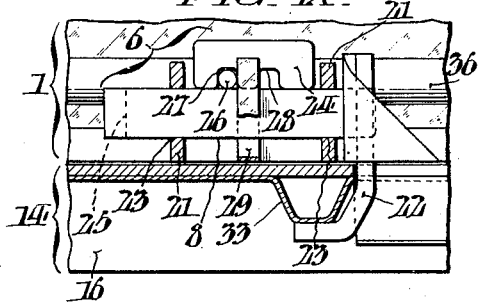
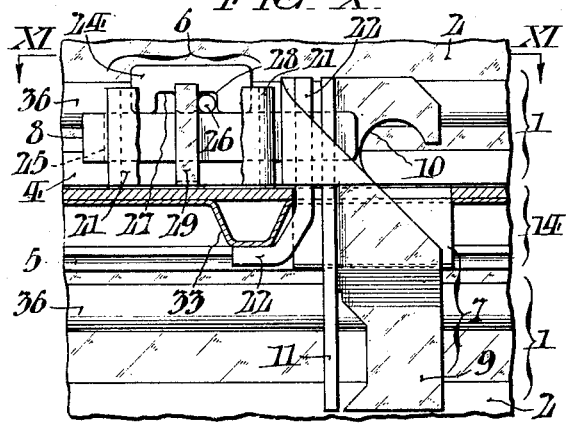
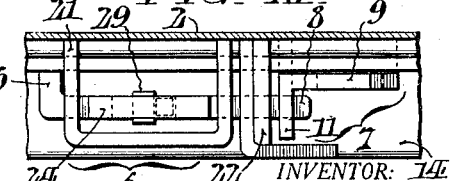
INVENTOR:
George W. Butts &
Albert C. Stewart,
BY Fraley Paul
ATTORNEYS Sept. 12, 1933.  G. W. BUTTS ET AL  1,926,432
TRANSPORTATION CONTAINER
Filed June 27, 1932   4 Sheets-Sheet 4
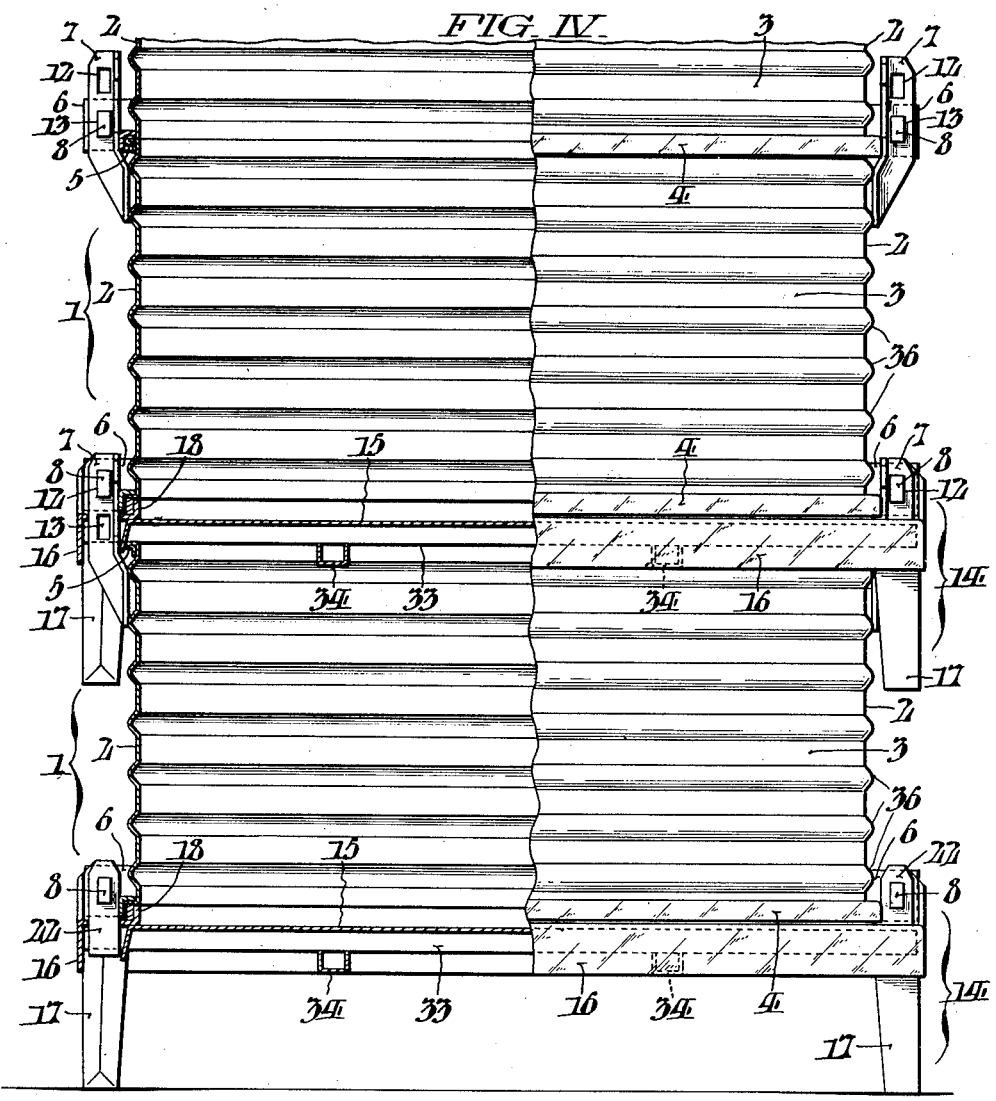
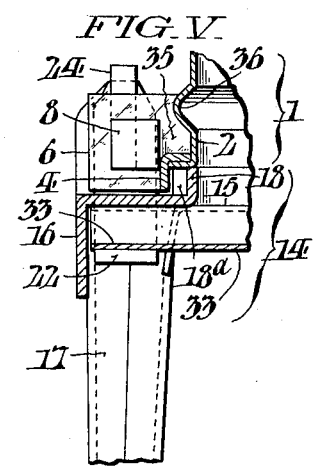
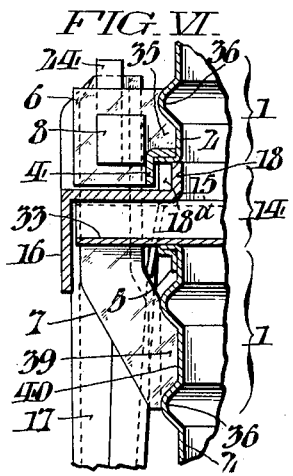
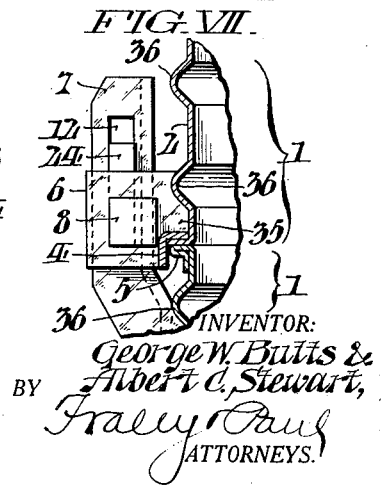

Patented Sept. 12, 1933

1,926,432

UNITED STATES PATENT OFFICE 1,926,432

TRANSPORTATION CONTAINER

George W. Butts, Wynnewood, Pa., and Albert C. Stewart, South Euclid, Ohio; said Butts assignor to Pennsylvania Railroad Company, a corporation of Pennsylvania Application June 27, 1932. Serial No. 619,534

5 Claims. (Cl. 294—67)

Our invention relates to containers for the transportation of stacked articles or the like, and more particularly to composite shipping containers made up of a number of smaller containers or sections, for use on railway cars, motor trucks, or trailers, and adapted to carry face bricks or the like in stacks which are maintained intact during loading, unloading and transportation of the containers.

Heretofore it has been proposed, for the transportation of bricks or the like, to employ a bottomless container in combination with a releasable load carrying floor member, serving as a lading platform for the stacked contents, the container having attachments thereon operable to lock the temporary platform to the walls of the container or to release the platform from the container walls. It has been proposed that containers of this character be made to dimensions, as to cross sectional area, such that a multiple of the containers arranged side by side may be conveniently accommodated on the floor of a freight car, and as to height, such that the top of the container, when loaded on a freight car, will be at the maximum permissible distance from the running rails.

The use of a container of this character enables bricks to be loaded in stacks at the place where they are manufactured and to be hauled by rail and truck to the place of ultimate destination, for example, a site where a building operation is being conducted, with the stacks remaining intact during the operations of loading and unloading, as well as during transportation, with consequent elimination of material handling at any point in the route. However, there may be occasions where facilities are not available, either at the manufacturing plant, or at the building site, for the hoisting and shifting of a brick container of such weight. There may also be occasions where such containers exceed in height the clearance at bridges or other superstructures.

Accordingly, the object of our present invention is to provide a series of small containers or interlocking container sections, of relatively small height in comparison to the aforementioned types of railroad containers, which are adapted to be nested together by superposing one container section above another in such manner that the lot of superposed container sections may be hoisted from the top thereof as a complete package, where the facilities are available for hoisting such a load, but separated and handled as individual units where such facilities are not available. Preferably, the individual container sections of our invention are made of a size such that their weight comes within the capacity of elevators or lifts used in building operations, so that the stacked contents may be carried intact a still further distance towards the point where they are to be used.

In the pending application for U. S. Letters Patent of George W. Butts, Serial No. 556,550, filed August 12, 1931, there is described a container generally similar in its object to the containers of our present invention, but the container there described is made up of container sections arranged in tiers and nested upon each other, but not locked to each other. The container of our present invention is characterized by the provision of locking attachments whereby each container section is adapted to be locked to each other and to intermediate load carrying platforms to form a unit which may be hoisted by attaching cables to lifting hooks at the top thereof. Furthermore, the container of the present invention is characterized by container sections which have complemental base and top portions, and which may be joined together in contiguous relation to form a single box, or joined together in spaced relation with the interposition of load carrying platforms to form a series of boxes which are locked together.

More specific objects and advantages characterizing our invention will become apparent from the description hereinafter of one embodiment or example thereof, having reference to the accompanying drawings. Of the drawings:

Fig. I represents a perspective view of a container of our invention, made up of smaller container sections, and adapted for the hauling of bricks or other material by freight car or motor truck, the container having lading platforms interposed between.

Fig. II represents a perspective view of a container made up of container sections, similar to those of Fig. I, but assembled in a different manner without the interposition of intermediate lading platforms.

Fig. III represents a side elevation of the bottom of a container arranged in still another manner, with a portion of the side broken away to show the manner in which the individual elements of the containers are fitted together.

Fig. IV represents an end elevation of the same, with a portion of the end broken away.

Figs. V, VI and VII represent enlarged cross sections, taken as indicated by the lines V—V, VI—VI and VII—VII, respectively, showing details of locking attachments for locking the container sections together and for locking a lading platform to a container section.

Fig. VIII represents an enlarged side view of a locking attachment provided at the base of each container section.

Fig. IX represents a similar view of the locking attachment, with parts thereof broken away, showing the latch member in engagement with a lading platform.

Fig. X represents a somewhat similar view of the locking attachment, showing the latch member as used for locking two container sections together with a lading platform therebetween.

Fig. XI represents a cross section of the same, taken as indicated by the lines XI—XI of Fig. X.

Fig. XII represents a perspective view of a combined locking device and hook provided at the top of each container section.

Fig. XIII represents a perspective view of a key member; and,

Fig. XIV represents a perspective view of a stirrup associated with the key member.

In the drawings, with special reference to Figs. I and II, there is shown a container, selected as one example of the practice of this invention, which is made up of a plurality of container sections, designated at 1, nested one above the other to form a complete shipping package for the transportation of stacked articles by freight car, motor truck or the like. Preferably each container is made to such dimensions, as to the area of the base portion, that when arranged side by side with other similar containers on the floor of a freight car, the lot of containers substantially occupies the complete floor space of the car.

Each container is made up of a plurality of identical sections 1; and in the form shown, each section 1 comprises a box shell having opposite side walls 2 and end walls 3 and without a bottom or a top. The side and end walls 2 and 3 may be made of corrugated sheets of metal for strengthening purposes. At its base portion each container section 1 is formed with a downturned flange 4, preferably a continuous flange rounded at the corners. At its top portion, each container 1 is provided with an outturned flange 5, likewise preferably continuous and rounded at the corners. The base flange 4 is of such shape and dimensions as to be complementary to the top flange 5, so that one container section 1 will readily fit over and nest upon a similar container section, as shown in Fig. II.

Near the bottom edges of each container section 1, locking devices, comprehensively designated at 6, are provided; and near the top edges of each container section, complementary locking devices, comprehensively designated at 7, are provided. The set of locking devices 6 at the bottom of each container section is so disposed with relation to the set of complementary locking devices 7 at the top that, when one container section is placed upon another, as shown in Figs. I and II, the sections may be locked to each other by operation of movable latch members 8.

The locking devices 7, which are disposed at the top of each container section 1 and which may be welded or otherwise attached to the container section, are each in the form of angles, as clearly shown in Fig. XII, one leg 9 of which is recessed at 10 to form a hook, and the other leg 11 of which extends at right angles and is provided with a pair of slots 12 and 13, one above the other. The hook-shaped recesses 10 serve as points of attachment for connections to overhead hoisting apparatus.

In association with each individual container or container section 1, there is employed a load carrying platform, such as shown comprehensively at 14. Each load carrying platform 14, as shown in Figs. I to IV, comprises a floor member 15 with downturned peripheral flanges 16 and with depending corner legs 17. The corner legs 17 are disposed adjacent to the side edges and may be made of pressed metal. At its top portion each load carrying platform 14 has an upwardly projecting flange 18, given additional thickness at intervals by block 18a, which is adapted to fit snugly within the downturned flange 4 of a container section 1 placed thereon. Moreover, the depending flange 16 at the base of the platform 14 is of such dimensions that the platform is adapted to fit snugly over the top flange 5 of a like container section 1. Each lading platform 14 has thereon four upstanding perforated lugs 22.

Accordingly, it will be apparent that the container sections 1 may be superposed, one above another, in nested contiguous relation, as shown in Fig. II; or there may be interposed, as shown in Fig. I, load carrying platforms 14 between each container section and the next lower section, in which case the platform 14 fits snugly over a container section therebeneath, and under a container section thereabove.

On some occasions it may be desirable to make up a composite container, such as shown in Fig. II, in which only one load carrying platform 14 is employed, and a series of container sections are assembled thereon in contiguous relation and locked together. On other occasions it may be desired to make up a composite container of a series of separable boxes in which case load carrying platforms 14 are interposed between the container sections 1; or it may be desirable to employ a compromise arrangement such as shown in Figs. III and IV. In any event the same locking devices may be used to secure together effectively the constituent elements of the composite container.

As shown in Figs. VIII, IX and X, the locking devices employed at the base of each container section 1 comprise generally U-shaped brackets 21 welded to the sides 2 of the container sections, latch members 8 slidable within slots 23 of the brackets 21, and keys 24 which serve to hold the latch members 8 in the desired position. Each latch member 8 has a turned end 25, affording a handle, and an upwardly projecting lug 26 which serves as a stop, and which in the present example is of circular cross section. Each key member 24, as shown in detail in Fig. XIII, comprises a flat plate having square notches 27 and 28 at its bottom edge. The key members 24 are held against dislodgement incident to vibration by means of U-shaped stirrups 29 welded thereon, as shown in detail in Fig. XIV. The stirrup 29 is adapted to surround the latch member 8 with its ends joined to the key member 24 so as to prevent accidental dislodgement of the key member.

When it is desired to move a latch member 8, the corresponding key member 24 is raised, the latch member is moved in the desired direction, and the key member 24 is again dropped. For example, when it is desired to lock two container sections 1 together with a load carrying platform 14 therebetween, each latch member 8 is moved to the position shown in Fig. X, in which case the operating end of the latch member projects well beyond the edge of the bracket 21 with which it is associated. In this position, the lug 26 of the latch member 8 is accommodated within the recess 28 of the key 24. When it is desired to attach to a container section 1 a load carrying platform 14, but not another container section, the latch member 8 is moved to the position shown in Fig. IX, in which case the operating end of the latch member 8 projects to a lesser distance beyond the edge of the bracket 21 with which it is associated. In this position, the lug 26 of the latch member is accommodated within the recess 27 of the corresponding key member 24. When it is desired to unlock one container section 1 from its load carrying platform 14, as well as from adjacent container sections, each latch member 8 is moved to the position shown in Fig. VIII, in which case the end of the latch member is in substantial alignment with the edge of the bracket 21 with which it is associated, and the lug 26 engages the side edge 30 of the key member 24.

It will be noted that when container sections 1 are locked together, with the interposition of lading platforms 14, the corner legs 17 of the lading platforms project downward at the outside of the side walls 2 of the next lower container section 1. Accordingly, the corner legs 17 do not detract from the available space within the shipping container for the accommodation of the lading.

Furthermore, the corner legs 17 are suitably provided with large circular openings 31 for engagement with lifting hooks when it is desired to raise a lading platform 14 by itself. Beneath the openings 31 small holes 32 are provided for the purpose of drainage. As shown in Fig. III, the lading platforms may be amply stiffened by means of transverse corrugations 33 with spaced longitudinal members 34 therebeneath.

In the particular example selected for illustration in the drawings, the locking devices 6 and 7 at the base and top portions respectively of the container sections 1 are so formed and secured to the container sections as to give ample strength to the composite container when the sides and ends are under tension incident to the lifting of the container with a load therein. Thus the locking devices 6, as shown in Figs. V, VI and VII, are welded to the sides of a container section with a projecting portion 35 of the brackets 21 fitted against a corrugation 36 in the side walls of the container section. As to the complementary locking devices 7 which are attached to the top portion of each container section, these devices may be suitably fabricated in the form shown in Fig. XII in which a bottom flange 37 is cut out as indicated at 38 and turned to a right angle as indicated at 39 to afford an irregular formation with an edge 40 adapted to fit between corrugations 36 in the side walls of the container section.

The operations involved in connection with a typical shipment of bricks in a container, such as illustrated in Fig. I, are as follows: First, bricks are arranged at the place of manufacture in stacks on individual lading platforms 14. The brick stacks are then loaded into container sections 1 by lowering the container sections over the stacks from above and manipulating the latch members 8 to lock each lading platform 14 to the container section associated therewith. Thereafter the loaded container sections may be hoisted and shifted separately onto a motor truck and superposed one above another to form a package of convenient height. After thus being nested together, the container sections 1 are locked to each other by further manipulation of the latch members 8. At a freight station near the place of shipment, each composite container may be hoisted from the truck and lowered onto a freight car platform by a single operation. Such a transfer may be effected by attaching lifting cables from an overhead hoist to the hook shaped recesses 10 in the locking devices 7 at the top of the container. After transferring the containers from motor truck to freight car and hauling the same to a freight station near their destination, a similar transfer may be made from freight car to motor truck.

When the containers have been hauled to the pace of destination, and assuming that their destination is a building site, where the hoisting facilities available are of relatively small capacity, the unloading of the containers may be performed by a series of operations in which one container section 1 at a time is removed from the motor truck and placed on the ground. Thereafter it may be desirable to have the container sections individually moved by small trucks, or elevators, or lifts, to various locations at the building site. Ultimately a container section 1 is unloaded by movement of the latch members 8 to release the subajacent load carrying platform 14, and then lifting the container section off its lading platform 14.

Where, in the course of a shipment of bricks, suitable facilities in the form of hoists of large capacity are available, so that it is not necessary to separate individual container sections, each container may be made up as shown in Fig. II, without the interposition of intermediate lading platforms 14, and it will be noted that the same identical container sections, used in the operation described with reference to Fig. I, may be employed, the container sections, however, being assembled together in a different manner.

From the above description in which reference is made to several examples of the practice of our invention, it will be apparent that the use of individual containers of the character described permits considerable flexibility in the handling of stacks of bricks. The particular method of transferring the stacked articles while maintaining the stacks intact, either in composite containers, assembled as shown in Fig. I, or in containers with sections assembled as shown in Figs. II, III or IV, may be varied to suit existing conditions with regard to the apparatus available at the points of loading or unloading, and at transfer points, and with regard to overhead clearance.

Furthermore, while there has been described herein a particular form of container suited for a particular service, and specific examples of its use, it is contemplated that changes may be made in the form of the containers; that the containers may be adapted for the transportation of numerous articles other than bricks, and that the method of loading, unloading and shifting the containers may vary from the described example, all without departing from the spirit of the invention as defined in the claims annexed hereto.

Having thus described our invention, we claim:

1. In combination, a bottomless container for transporting stacked articles or the like, comprising a frame having side and end walls, a releasable load carrying platform disposed beneath said frame, and means on said frame for engaging and supporting said platform, said container having at its base portion a continuous marginal flange formed to fit over the top edges of said platform, and said platform having at its base portion a continuous marginal flange formed to fit over the top edges of said container frame.

2. A bottomless container for transporting stacked articles or the like, comprising a box shell having a set of locking attachments at the base portion thereof and having a complementary set of locking attachments at the top portion thereof, each locking attachment of one of said sets including a movable latch member, and each locking attachment of the other set including spaced slots for the reception of such a latch member, whereby one such container may be superposed upon and locked to another, either in contiguous relation or in spaced relation.

3. In combination, a bottomless container for transporting stacked articles or the like comprising a frame having side and end walls, said container frame having a set of locking attachments at the base portion thereof, and having a complementary set of locking attachments at the top portion thereof, each locking attachment of one of said sets including a movable latch member, and each locking attachment of the other set including a slot for the reception of such a latch member, and a load carrying platform beneath said container frame having an attachment with a slot for the reception of such a latch member.

4. A shipping container for transporting stacked articles or the like, comprising a plurality of bottomless container sections superposed upon each other, and releasable load carrying platforms disposed beneath each container section and the next lower section, each container section having locking attachments at its top and base portions, and each load carrying platform having locking attachments at the sides, one of said locking attachments including a latch member operable with the other attachments to lock said container sections to each other and to said platforms.

5. A shipping container for transporting stacked articles or the like comprising a plurality of bottomless container sections superposed upon each other, and releasable load carrying platforms disposed beneath each container section and the next lower section, each said platform having at the top thereof a continuous marginal flange adapted to fit within the container section next above, and having at its base a continuous marginal flange adapted to fit over the container section next below, and having depending legs outside said flanges.

GEORGE W. BUTTS.
ALBERT C. STEWART.